United States Patent [19]

Ludwig et al.

[11] Patent Number: 4,771,971

[45] Date of Patent: Sep. 20, 1988

[54] PAYLOAD CONTAINER AND FASTENING STRUCTURE FOR USE IN SPACE VEHICLES

[75] Inventors: K.-P. Ludwig, Bremen, Fed. Rep. of Germany; R. R. Lawson, Bristol, England

[73] Assignee: Erno Raumfahrttechnik GmbH, Bremen, Fed. Rep. of Germany

[21] Appl. No.: 41,192

[22] Filed: Apr. 22, 1987

[30] Foreign Application Priority Data

Apr. 25, 1986 [DE] Fed. Rep. of Germany ....... 3613985

[51] Int. Cl.$^4$ .............................................. B64G 1/22
[52] U.S. Cl. .................. 244/158 R; 244/161; 244/118.1; 361/381; 361/382; 361/393; 361/394; 165/104.33; 410/90
[58] Field of Search ............... 244/118.1, 158 R, 159, 244/161; 410/90; 361/381–394, 417, 418; 165/80.2–80.5, 104.33

[56] References Cited

U.S. PATENT DOCUMENTS

| | | | |
|---|---|---|---|
| 2,938,686 | 5/1960 | Van Winkle et al. | 361/381 |
| 3,259,400 | 7/1966 | Tantinger et al. | 410/90 |
| 3,582,865 | 6/1971 | Franck | 361/383 |
| 3,853,379 | 12/1974 | Goodman et al. | 361/391 |
| 3,861,541 | 1/1975 | Taft et al. | 410/90 |
| 3,904,933 | 9/1975 | Davis | 361/394 |
| 4,037,270 | 7/1977 | Ahmann et al. | 361/385 |
| 4,315,300 | 2/1982 | Parmerlee et al. | 361/384 |
| 4,324,375 | 4/1982 | O'Neill | 165/104.33 |
| 4,639,829 | 1/1987 | Ostergrer et al. | 361/385 |

*Primary Examiner*—Galen Barefoot
*Attorney, Agent, or Firm*—Ralf H. Siegemund

[57] ABSTRACT

A plurality of payload containers are assembled from modularly extendable base plates, and standardized side walls and covers; each base plate has a trapezoidally cross-sectioned trough-like guide channel and includes centrally positioned counterplug means for providing mechanical electrical communication and thermotechnical connection; a payload container fastening plate is provided with corresponding and matching trapezoidally cross-sectioned ridge-like extensions received by the troughs in the container bottom plates for guiding, indexing and heat removal; and plug means extend from the trapezoidal ridges for plug connections with the counterplugs.

8 Claims, 1 Drawing Sheet

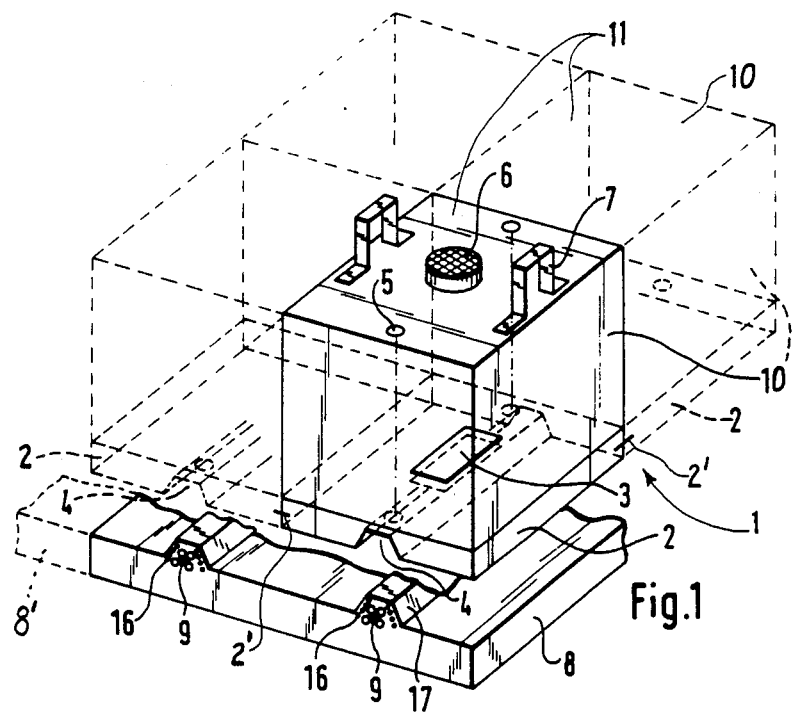
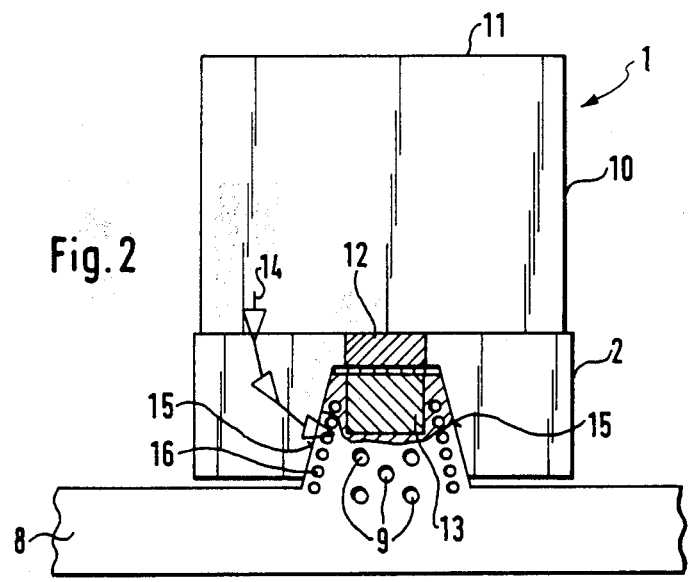

PAYLOAD CONTAINER AND FASTENING STRUCTURE FOR USE IN SPACE VEHICLES

BACKGROUND OF THE INVENTION

The present invention relates to a combined payload container and fastening structure for such a container to be used in combination with space vehicles for purposes of transporting and operation of any content in that container.

Presently payloads, e.g. experimental devices or communication arrangements and devices or the like, are provided in a space vehicle as a fixed installation. They fulfill their task either until the experiment had been completed or until it has to be stopped or is stopped for reasons of a tecnhical breakdown, or at the end of the use life of the space vehicle as a whole. If the vehicle is to have a longer use-life, that is for example if it is going to be re-used, it has to be removed from orbit and brought back to Earth which of course is very expensive, and following any repair and/or refurbishing or the like, the vehicle is then placed back into orbit. It is often simpler and more economical to just abandon any defective space vehicles part or payloads and provide new ones instead in orbit.

Exchanging payloads presupposes a certain kind of standardized system in terms of structure generally but also regarding relevant mechanical and/or electrical communication and thermo-technical engineering aspects as well as features related thereto and involving particularly the connection between payloads on one hand and the space vehicle structure on the other hand including power supply waste disposal or just return paths or the like.

U.S. patent application, Ser. No. 028,238, filed Mar. 20, 1987 in the U.S. Patent Office (see also German patent application No. P 36 09 770.5), discloses a payload transport and operating device for space vehicles which has at its principal goal the extension of the use-life of on-board equipment. In that particular application payload containers are described which can be assembled from various standardized basic elements so as to accommodate different sizes for different experiments, loads or the like. These containers will then be fastened securely by means of screws to a connecting plate which connection can be effected both on Earth as well as in orbit. These connecting plates in turn are fastened to the space vehicle structure. The payload is brought into operation through electrical communication and thermo-technical connections as well as as far as supply and disposal is concerned.

This particular arrangement requires mechanical fastening on the container fastening plate by an astronaut which requires him to exercise a great deal of skill. This by and in itself is not a drawback since astronauts are highly skilled people in the first place. However, in the case of large containers accommodating a large payload and being characterized by a large mass, an accurate alignment of the connecting and fastening structure poses some difficulty in spite of conical guide elements providing indexing and centering function. Moreover, some connections are provided outside of the confines of the particular container which on the basis of a fairly large distances from the payload itself require installation of relatively long connecting cables, conduits or the like. Cable and conduits by themselves amount to additional weight one may wish to avoid since any structural weight that is needed just for conduction purposes and reduces the available payload capacity. Another drawback of this device is that the particular payload transport and operating structure is limited to a fixed number of basic surface areas. Payloads that happen to be larger from an overall point of view than the largest container base will therefore have to be accommodated by a second container and this particular payload must be distributed over two containers.

DESCRIPTION OF THE INVENTION

It is an object of the present invention to provide a new and improved modular and standardized payload container structure as well as standardized payload fastening structure for space vehicles wherein the payload container can be fastened and exchanged on Earth as well as in space in a still more simpler fashion avoiding drawbacks of earlier devices.

In accordance with the preferred embodiment of the present invention it is suggested to provide a payload container from a modularly expendable single size container base plate as well as for attachable standarized side plates under further inclusion of structure for covering, and exchanging or supplementing the containers, such that a selectible plurality of containers obtain; the base plates are provided on the undersides with a guide and receiving structure of trapezoidal cross section for connection with a fastening device through a trapezoidal extension on the upper side of a fastening structure and electrical mechanical and fluid conductive connections are provided through a combination of plugs, counterplugs in the trapezoidal structures.

Regarding the base plate it is to be of rectangular shape and provided for mechanical connection to another plate of like configuration. They have fastening mechanisms for connections to differently long but standardized side walls, the latter cooperate with covers for the completion of any payload transport and operating container for a space vehicle. The trapezoidal contour of the trough in the base plate is provided for purposes of mechanical guiding and indexing the trapexoidal bar in the fastening structure for safely conecting the payload container with that structure. The trough in the base plate is provided with a connector plug serving for obtaining electrical communication and thermo-technical connection. Preferably this counterplug is provided in the center of the base plate to receive a plug of the ridge in fastening structure. The fastening structure may be provided with optical markings facilitating alignment and indexing of the connecting procedure. The fastening structure is basically of rectangular plate-like construction. Preferably the length dimension corresponds to the length of plural long sides of the container, the width dimension of the fastening plate corresponds to a multiple of the short side walls of the containers. The fastening plate has several parallel running trapezoidal extensions for being received by the respective troughs or channels in the payload containers. These trapezoidal extensions are provided in regular spacing with the plug-like connection feature. This feature establishes the connection between the payload proper and the payload container fastening structure; the connection may be provided with the aid of optical and/or electromechanical structures. The contact or interface areas between the respective slanted side wall surfaces of the trapezoidal guides of the base plate and the mathcing ridges or side wall surface of extensions of the fastening structure provide for passive heat dissipation from the payload container. The heat may in addition be removed through active or cooling structure using a coolant which runs through the plug connection and into the ridges.

DESCRIPTION OF THE DRAWINGS

While the specification concludes with claims particularly pointing out and distinctly claiming the subject matter which is regarded as the invention, it is believed that the invention, the objects and features of the invention and furhter objects, features and advantages thereof will be better understood from the following description taken in connection with the accompanying drawings in which:

FIG. 1 is a perspective view of a payload container which is comprised of four standardized base plates, side walls cover and fastening structure; and FIG. 2 is a cross section through a payload container shown in FIG. 1 and the fastening structure particularly in the area of the plug-in connection.

Proceeding now to the detailed description of the drawings the figures show a plurality of base plates 2 and side wall structures 10 as well as covers 11 all of which are standardized. The covers 11 may be provided as or include heat protection foils. The figures show certain side walls 10 to be partitions, but they could be selectively omitted to the extent support stability for the covers permits such an omission. Base-to-base connections are identicated by schematic connections 2'. The containers are to be connected to a container fastening structure 8 which is comprised of a relatively large rectangular plate. By way of example the plate 8 may have a dimension to accommodate at least four containers. The fastening and connect plug 8 may be expandable to be itself connected to others (e.g. 8') of like configuraton and in toto they are dimensioned to fit to a connect structure of a space vehicle.

Fastening plate 8 is provided with trapezoidal, upward extensions 17. These bar or ridge-like extensions have a trapezoidal cross section and extend from the upper side of plate 8. They are received by trapezoidal indents or trough-like channels 4 in the bottom of the plates 2. The trapezoidal cross section of guide channels 4 match the bar-like extensions 17. The fastening structure 8 is connectable to the space vehicle structure in various configurations.

The trapezoidal bar-like extensions 17 include power feed and discharge lines by means of which the container will be connected to the power supply as well as any waste disposal and other discharge or return path conduits of the space vehicle. The trapezoidal extensions 17 are provided with plug-like connection structures 13 pertaining to the fastening structure 8. These plugs 13 are provided in regular spacings which preferably correspond to the length of the respective container base plate 2. These plugs 13 receive plug-like connection structures 12 pertaining to the payload container and being part of the bottom structure (2) thereof. These counterplugs 12 in the bottoms of trough 4 are disposed centrally in each bottom plate 2.

For purposes of fastening containers 1 to the fastening structure 8 they will be seated onto the structure 8 so that not only will the trapezoidal or channel troughs 4 receive the bars or projections 17 of the structure 8 but optical markings on the structure 8 permit a rather rapid and safe positioning of the containers on the plate 8 such that the plug connections 12 of the container will align with a counterplug connection 13 of the projection 17.

The thus indexed fastening structures 5 will connect the container 1 safely with the space vehicle.

The slanted surfaces (interfaces) 15 as between the container 1 and the fastening structure 8 serve primarily for the passive heat removal from the containers. The heat thus flowing out of the container 1 will be captured by an active operating cooling device 16 in bar or ridge 17 for removing the heat further either for further utilization elsewhere in the vehicle or for dissipation by means of radiation from the vehicle or the like. The ducts of this active cooling device run parallel to the sidewall surfaces of the trapezoidal bars and projections 17.

In order to cover initially or for exchanging or supplementing the payload containers 1, the covers 11 may be provided with handles 7 by means of which an astronaut can handle such a cover or the container as a whole. Moreover, a docking mechanism 6 may be provided for automated or remote control docketing. The fastening of the payload container 1 to the payload container fastening device 8 as well as the handle 7 on the payload container aare to be provided mechanically with sufficient strength so that they can serve as walking aid to astronauts when moving about.

The invention actually establishes a modular standardized, payload container system cooperating with a standardized payload container fastening structure 8. The standardization permits, in a simple manner, to construct and assemble rectangular patterns of payload containers in any size and kind of rectangular arrangement. They can be assembled, disassembled and so forth with respect to the space vehicle equally well in sapce as well as on Earth. They are provided with standardized plug connections for all necessary supply and disposal functions as far as the payload is concerned. Moreover, they permit passive heat removal particularly through the side walls of the trapezoidal trough 4 as contacting ridges 17.

The invention is not limited to the embodiments described above but all changes and modifications thereof, not constituting departures from the spirit and scope of the invention, are intended to be included.

We claim:

1. A combination of a payload container and a payload fastening structure for space vehicles comprising:
    a plurality of payload containers assembled for modularly extendable base plates, and standardized side walls and covers;
    a trapezoidally cross-sectioned trough like guide channel in the bottom plate of the container and including counterplug means in and on the respective channel bottom, for providing mechanical electrical communication and thermotechnical connection;
    a payload container fastening structure being provided with basically corresponding and matching trapezoidally cross sectioned ridge like extensions received by said troughs in said container bottom plates; and
    plug means in and extending from said trapezoidal ridges for plug connections with the counterplugs in said containers.

2. Device as in claim 1 said container base plate being of rectangular configuration and provided for mechanical connection to other similar base plates.

3. Device as in claim 1 wherein said counterplugs are arranged in the center of the bottom plate.

4. Device as in claim 1 and including markings for indexing.

5. Device as in claim 1 wherein said fastening device includes a plate, said ridges being provided in the plurality and running in parallel.

6. Device as in claim 1 wherein said channel has surfaces providing for passive heat dissipation into the respective ridge there being an active heat removal and cooling system provided in said ridge.

7. Device as in claim 1 said covers being provided with at least one handle.

8. Device as claim 1 wherein said cover being provided with a docking structure.

* * * * *